(12) United States Patent
Sethi et al.

(10) Patent No.: US 11,836,481 B1
(45) Date of Patent: Dec. 5, 2023

(54) METHOD AND SYSTEM FOR EXECUTING AN APPLICATION UPGRADE BASED ON REAL-TIME MONITORING

(71) Applicant: Dell Products L.P., Round Rock, TX (US)

(72) Inventors: Parminder Singh Sethi, Ludhiana (IN); Lakshmi Saroja Nalam, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 76 days.

(21) Appl. No.: 17/831,615

(22) Filed: Jun. 3, 2022

(51) Int. Cl.
*G06F 9/44* (2018.01)
*G06F 8/65* (2018.01)
*G06F 9/48* (2006.01)
*G06F 9/50* (2006.01)

(52) U.S. Cl.
CPC .............. *G06F 8/65* (2013.01); *G06F 9/4881* (2013.01); *G06F 9/5038* (2013.01)

(58) Field of Classification Search
None
See application file for complete search history.

(56) References Cited

U.S. PATENT DOCUMENTS 10,387,137 B2 * 8/2019 Wang ......................... G06F 8/70
11,561,782 B2 * 1/2023 Nidugala .................. G06F 8/65
2019/0391800 A1 * 12/2019 Lin ............................ G06F 8/65
2022/0100851 A1 * 3/2022 Mehrotra .................. G06F 8/65
2023/0135884 A1 * 5/2023 Meshram .................. G06F 8/65
717/172

OTHER PUBLICATIONS

Partner Program Knowledgebase (n.d.). Device Twin Property. Retrieved May 11, 2022, from https://knowledgebase_iotconnect.io/knowledgebase/device-twin-property/.

* cited by examiner

*Primary Examiner* — Qamrun Nahar
(74) *Attorney, Agent, or Firm* — Chamberlain, Hrdlicka, White, Williams & Aughtry

(57) ABSTRACT

A method for managing an application upgrade includes: obtaining metadata of a client device from a production host (PH) client device twin; executing, using the metadata, an emulation to generate an application upgrade strategy for applying a plurality of application upgrades; setting, using the metadata, a first entry in a PH required properties file; transferring the application upgrade strategy and the first entry from the PH client device twin to a client environment (CE) client device twin; storing, the application upgrade strategy and the first entry in a CE required properties file; initiating the plurality of application upgrades based on the application upgrade strategy and the first entry; setting a second entry in a CE reported properties file; transferring the second entry from the CE client device twin to the PH client device twin; and verifying a status of the plurality of application upgrades using the second entry.

20 Claims, 7 Drawing Sheets

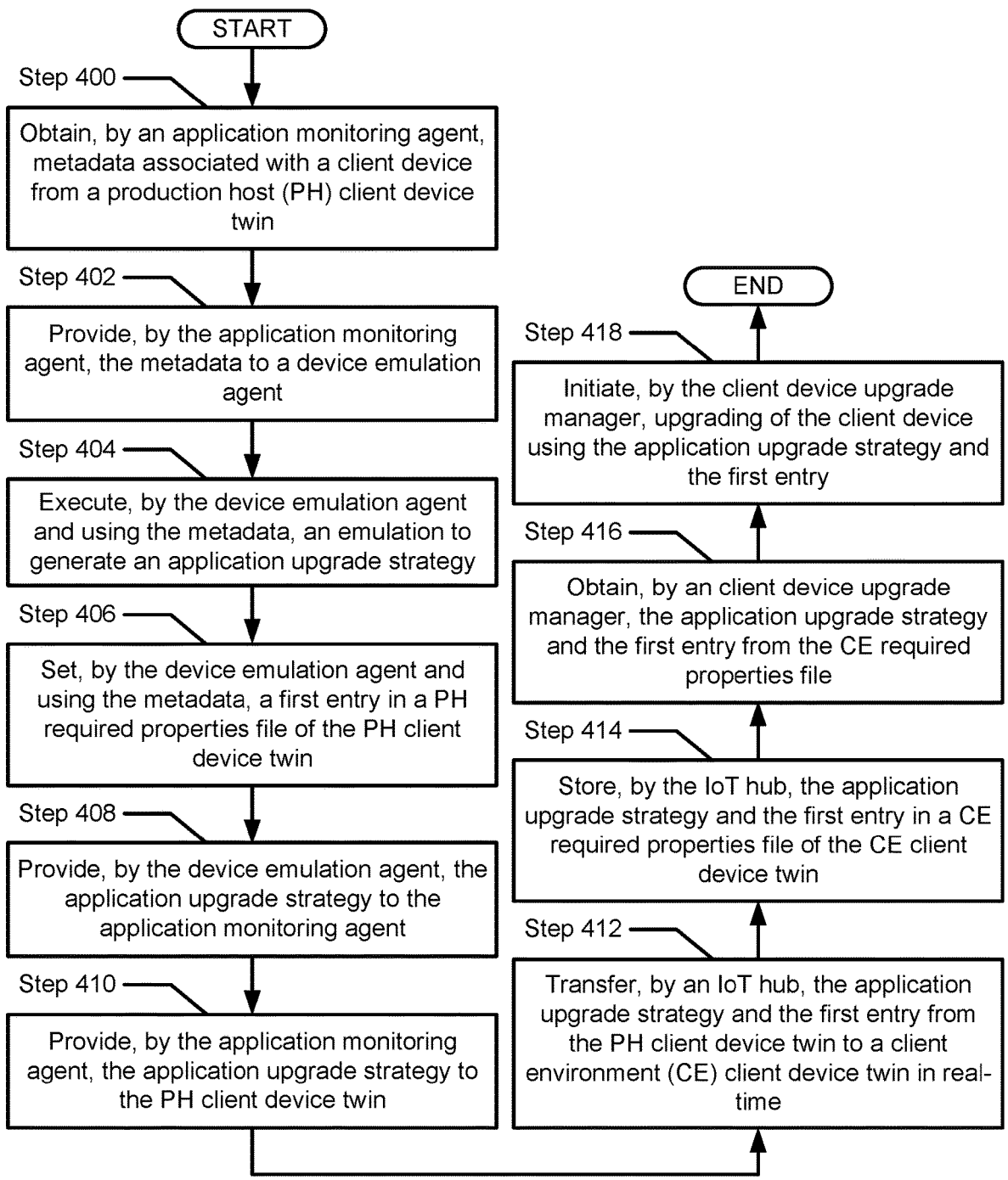
FIG. 4.1

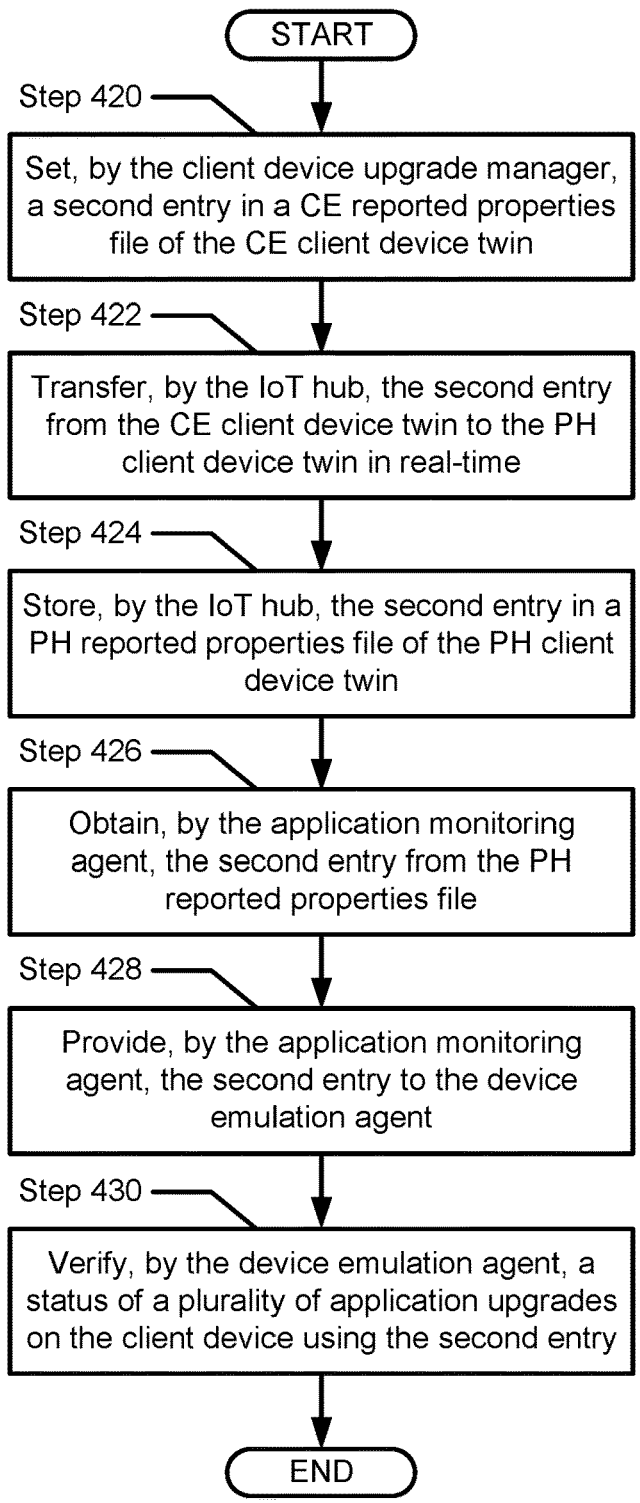
FIG. 4.2

METHOD AND SYSTEM FOR EXECUTING AN APPLICATION UPGRADE BASED ON REAL-TIME MONITORING

BACKGROUND

Computing devices in a system may include any number of internal components such as processors, memory, and persistent storage. The computing devices may execute applications (e.g., software). Each application may be upgraded to newer versions to protect the computing devices from security vulnerabilities of the applications.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1 and 4.2 show a method for executing an application upgrade based on real-time monitoring of a plurality of client device twins in accordance with one or more embodiments of the invention.

DETAILED DESCRIPTION

Figure 1:
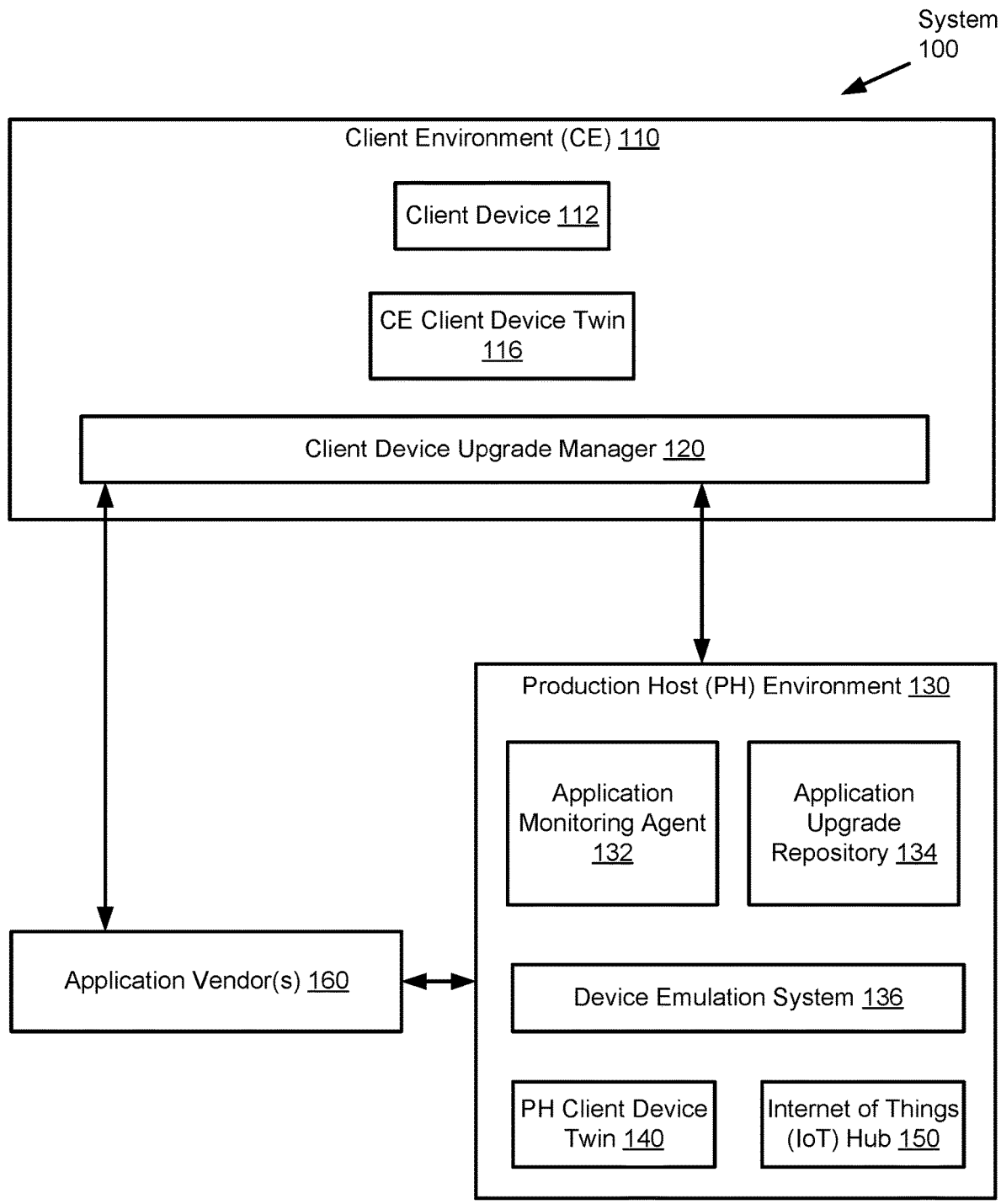
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, when an application upgrade is being executed, a user of a client device (e.g., a computing device) may experience performance degradation in production workloads (e.g., reading data from a table, writing data to the table, etc.). More specifically, performance degradation may be experienced because the application upgrade may use up all of the computing resources available in the computing device. Embodiments of the invention relate to methods and systems for executing an application upgrade based on real-time monitoring of a plurality of client device twins (e.g., production host (PH) client device twins and client environment (CE) client device twins, which will both be discussed in more detail below). More specifically, various embodiments of the invention may obtain metadata of the client device from a PH client device twin. Based on the metadata, an emulation will be executed to generate an application upgrade strategy and a first entry will be set in a PH required properties file of the PH client device twin. The application upgrade strategy and the first entry will then be transferred, in real-time via an Internet of Things (IoT) hub, from the PH client device twin to a CE client device twin. The application upgrade strategy and the first entry may be stored in a CE required properties file of the CE client device twin. The client device may then initiate the application upgrade based on the application upgrade strategy and the first entry. After initiating the application upgrade, a second entry will be set in a CE reported properties file of the CE client device twin. The second entry will then be transferred, in real-time via the IoT hub, from the CE client device twin to the PH client device twin. Finally, a status of the application upgrade on the client device will be verified using the second entry. Such real-time monitoring of the CE client device twin and the PH client device twin advantageously ensures that the computing device is not being used by users (e.g., not idle), and that the application upgrade will be executed when the computing device is idle. In this manner, users may experience less performance degradation during production workloads.

The following describes various embodiments of the invention.

FIG. 1 shows a diagram of a system (100) in accordance with one or more embodiments of the invention. The system (100) includes a client environment (CE) (110), a production host (PH) environment (130), and one or more application vendors (160). The system (100) may include additional, fewer, and/or different components without departing from scope of the invention. Each component may be operably connected to any of the other component via any combination of wired and/or wireless connections. Each component illustrated in FIG. 1 is discussed below.

In one or more embodiments of the invention, the CE (110) may include a client device (112), a CE client device twin (116), and a client device upgrade manager (120). The client device (112), the CE client device twin (116), and the client device upgrade manager (120) may be physical or logical devices, as discussed below. In one or more embodiments, the CE (110) may include any number of client devices and CE client device twins without departing from the scope of the invention.

In one or more embodiments of the invention, the client device (112) may include one or more applications (not shown). The applications may be logical entities executed using computing resources (not shown) of the client device (112). Each of the applications may perform similar or different processes. In one or more embodiments, the applications may provide services to users (e.g., clients (not shown)) of the client device (112). For example, the applications may host services and/or components. The services and/or components may include, but are not limited to: instances of databases; email servers; etc.

Figure 6:
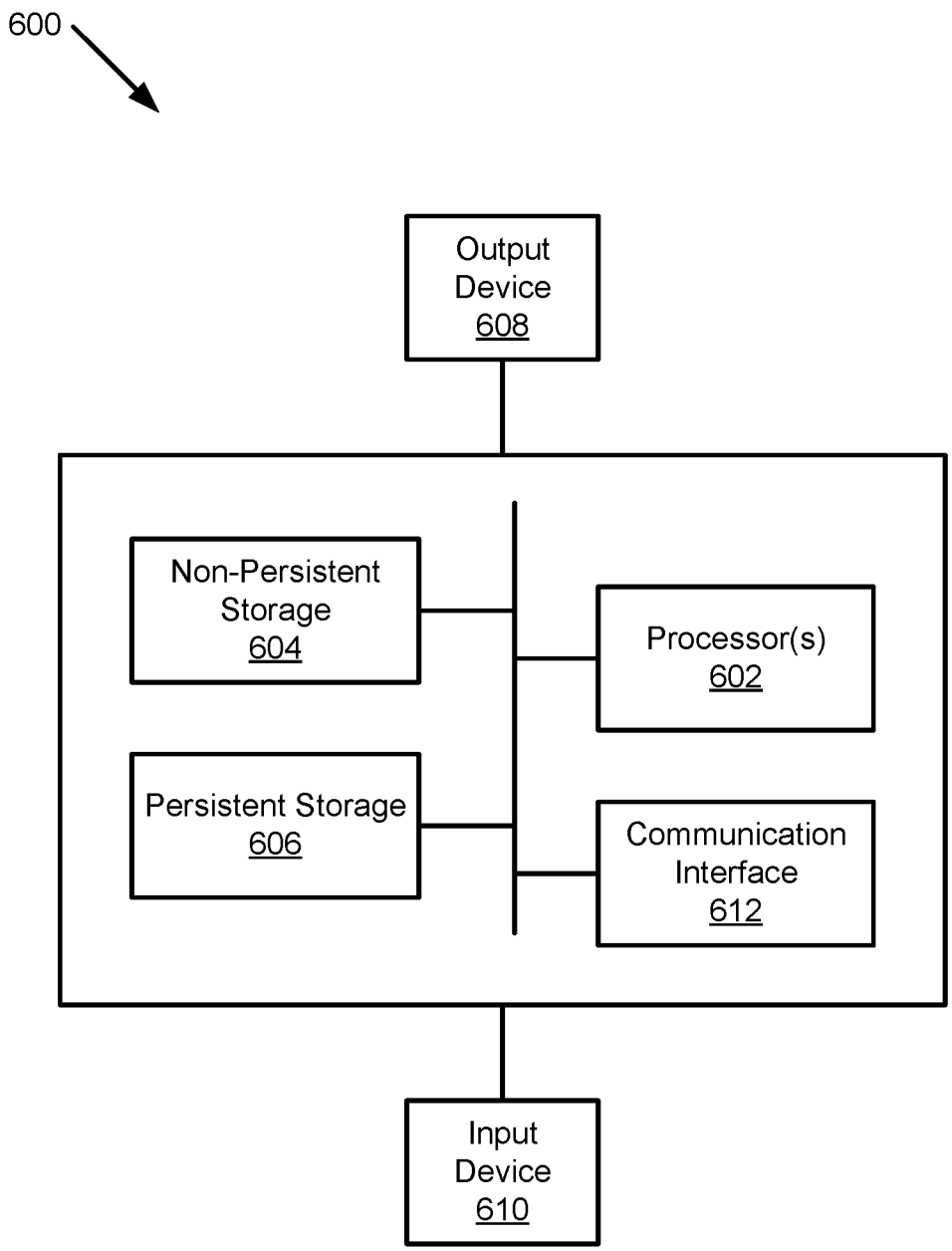
FIG. 6 shows a diagram of a computing device in accordance with one or more embodiments of the invention.

In one or more embodiments of the invention, the client device (112) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored on the persistent storage, that when executed by the processor(s) of the computing device, cause the computing device to perform the functionality of the client device (112) described throughout this application.

Alternatively, in one or more embodiments of the invention, the client device (112) may be implemented as a logical device. The logical device may utilize the computing resources of any number of computing devices to provide the functionality of the client device (112) described throughout this application.

In one or more embodiments of the invention, the applications may be upgraded based on newer versions available for installation. The installation of application upgrades may be performed and/or otherwise initiated by the client device upgrade manager (120). The client device upgrade manager (120) may periodically collect information (e.g., device state information, device configuration information, etc.) from the client device (112) or the CE client device twin (116). The client upgrade manager (120) may also collect information from the client device (112) or the CE client device twin (116) in real-time (e.g., on the order of milliseconds or less).

In one or more embodiments of the invention, the applications may be implemented as computer instructions, e.g., computer code, stored on a persistent storage that when executed by a processor(s) of a computing device cause the computing device (e.g., 600, FIG. 6) to provide the functionality of the applications described throughout this application.

In one or more embodiments of the invention, the client device upgrade manager (120) may then send this information to the application vendor(s) (160) for technical support (e.g., recommendations and/or fixes for hardware and/or software failures) to the client device (112). The application vendor(s) (160) may then provide one or more catalog files (described in more detail below) that specify the requirements of the client device (112) to the PH environment (130).

In one or more embodiments of the invention, the client device upgrade manager (120) may obtain the estimated time that one or more application upgrades may take. The client device upgrade manager (120) may obtain the application upgrade time estimation from the PH environment (130). The client device upgrade manager (120) may then provide the application upgrade time estimation and optimal time slots in which the application upgrade may be performed to the client device (112).

In one or more embodiments of the invention, the client device upgrade manager (120) may further include functionality of monitoring device configuration information of the client device (112). The device configuration information of the client device (112) may include, but is not limited to: operating system information of a client device; one or more applications already installed to a client device; current versions of such applications already installed to a client device; processing power of a client device; etc. The device configuration information of the client device (112) may be provided to the PH environment (130).

In one or more embodiments of the invention, the client device upgrade manager (120) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the client device upgrade manager (120) described throughout this application.

Alternatively, in one or more embodiments of the invention, similar to the client device (112), the client device upgrade manager (120) may also be implemented as a logical device.

In one or more embodiments of the invention, the CE client device twin (116) may be a real-time digital instance (e.g., representation) of the client device (112) executing on an Internet of Things (IoT) hub (150). The CE client device twin (116) may be used to synchronize a current (e.g., present, actual) device state information of the client device (112) between the client device (112) and the IoT hub (150). The CE client device twin (116) may include a CE required properties file (e.g., 302, FIG. 3) and a CE reported properties file (e.g., 304, FIG. 3). Additional details of the CE client device twin (116) are described below in reference to FIG. 3.

In one or more embodiments of the invention, the IoT hub (150) may be a platform-as-a-service (PaaS). More specifically, the IoT hub (150) may operate as a central message hub for bi-directional communication between an IoT application and computing devices that the IoT hub (150) manages. The IoT application may be a collection of services and components that may, for example: receive incoming device events from a computing device; analyze incoming device events of a computing device; send commands to a computing device to manipulate device events of that computing device; etc. The computing devices may include, but are not limited to: a CE client device twin (116), a PH client device twin (140); etc. In one or more embodiments, a cloud resource may host the IoT hub (150).

In one or more embodiments of the invention, the CE client device twin (116) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the CE client device twin (116) described throughout this application.

Alternatively, in one or more embodiments of the invention, similar to the client device (112), the CE client device twin (116) may also be implemented as a logical device.

Turning back to the PH environment (130), in one or more embodiments of the invention, the PH environment (130) may include an application monitoring agent (132), an application upgrade repository (134), a device emulation system (136), a PH client device twin (140), and the IoT hub (150). The production host environment (130) may include additional, fewer, and/or different components without departing from the scope of the invention.

In one or more embodiments of the invention, the PH environment (130) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the PH environment (130) described throughout this application.

Alternatively, in one or more embodiments of the invention, similar to the client device (112), the PH environment (130) may also be implemented as a logical device.

In one or more embodiments of the invention, the application upgrade repository (134) may store versions of the application upgrade(s). The application upgrade repository (134) may be updated by the application vendor(s) (160) based on newer versions of the application upgrade(s) being available. The application upgrade repository (134) may further store catalog files related to the application upgrade(s) to be installed. The catalog files may include, but are not limited to: a compatible device model; a minimum application version for the application upgrade to be installed; a compatible operating system (and corresponding version of such operating system); an upgrade sequence; etc.

In one or more embodiments of the invention, the application monitoring agent (132) may push the application upgrade(s) to the client device upgrade manager (120). The application monitoring agent (132) may also obtain an identifier of the client device (112) that is managed by the client device upgrade manager (120). The application monitoring agent (132) may further obtain the information related to the application(s) already installed to the client device (112) from the client device upgrade manager (120).

In one or more embodiments of the invention, the application monitoring agent (132) may monitor the application upgrade repository (134) to identify the application upgrade(s) available in the application upgrade repository (134). The application monitoring agent (132) may then identify a compatible application upgrade for the client device (112). The application monitoring agent (132) may identify the compatible application upgrade using the catalog files related to the application upgrade in the application upgrade repository (134).

In one or more embodiments of the invention, in response to an emulated application upgrade (e.g., an emulation of an application upgrade that is to be performed on an emulated client device (e.g., device A emulation (224), described below in reference to FIG. 2)), the application monitoring agent (132) may initiate an estimation of performing the application upgrade on the client device (112). The application upgrade estimation(s) may be provided to the PH client device twin (140). The application upgrade estimation(s) may then be transferred (by the IoT hub (150)) in real-time from the PH client device twin (140) to the CE client device twin (116). The client device upgrade manager (120) may obtain the application upgrade estimation(s) from the CE client device twin (116), as discussed in more detail below.

In one or more embodiments of the invention, the application monitoring agent (132) may provide information related to an application upgrade to a device emulation orchestration engine (e.g., 210, FIG. 2), which is part of the device emulation system (136). In one or more embodiments, the information related to the application upgrade may include, but is not limited to: an application version of an application upgrade; supported operating system version(s) for an application upgrade; etc.

In one or more embodiments of the invention, the application monitoring agent (132) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the application monitoring agent (132) described throughout this application.

Alternatively, in one or more embodiments of the invention, similar to the client device (112), the application monitoring agent (132) may also be implemented as a logical device.

In one or more embodiments of the invention, the device emulation system (136) may be a system of device emulation containers (e.g., device emulation container A (220), device emulation container L (230), described below in reference to FIG. 2) that may be configured to emulate the client device (112). The emulation of the client device (112) may be used for applying the application upgrade to an emulated device and measuring application upgrade metrics.

In one or more embodiments of the invention, the application upgrade metrics may include, but are not limited to: the time taken to complete the application upgrade; the number of reboots required after performing the application upgrade; etc. Additional details the device emulation system (136) are described below in reference to FIG. 2.

In one or more embodiments of the invention, the device emulation system (136) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the device emulation system (136) described throughout this application.

Alternatively, in one or more embodiments of the invention, similar to the client device (112), the device emulation system (136) may also be implemented as a logical device.

In one or more embodiments of the invention, similar to the CE client device twin (116), the PH client device twin (140) may be a real-time digital instance of the client device (112) executing on the IoT hub (150). The PH client device twin (140) may include a PH required properties file (e.g., 312, FIG. 3) and a PH reported properties file (e.g., 314, FIG. 3). Additional details of the PH client device twin (140) are described below in reference to FIG. 3.

In one or more embodiments of the invention, the PH client device twin (140) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the PH client device twin (140) described throughout this application.

Alternatively, in one or more embodiments of the invention, similar to the client device (112), the PH client device twin (140) may also be implemented as a logical device.

In one or more embodiments of the invention, the client device upgrade manager (120) may connect (e.g., register) to the IoT hub (150). To be able to connect to the IoT hub (150), the client device upgrade manager (120) may make an application programming interface (API) call to the IoT hub (150). In one or more embodiments, an API call may refer to a process of an application submitting a request to an API to retrieve the requested data from an external application. An API may represent a collection of methods and procedures (e.g., retrieving information about an API source, updating the API source, etc.) that may be executed by one or more applications in a computing system (e.g., 600, FIG. 6). The collection of methods and procedures may be designed and configured to facilitate the client device upgrade manager's (120) connection to the IoT hub (150).

In one or more embodiments of the invention, based on receiving an API call from the client device upgrade manager (120), the IoT hub (150) may send a connection string to the client device upgrade manager (120). The client device upgrade manager (120) may then use the connection string to connect to the IoT hub (150). In one or more embodiments, the connection string may be a data structure that includes one or more parameters (e.g., a location of a database, an authentication information for a database, etc.) required for an application to connect to a database (or any logical container).

In one or more embodiments of the invention, after the client device upgrade manager (120) is connected to the IoT hub (150), the IoT hub (150) may generate the CE client device twin (116) and the PH client device twin (140). In one or more embodiments, the IoT hub (150) may also generate: (i) an empty CE required properties file (e.g., 302, FIG. 3) and CE reported properties file (e.g., 304, FIG. 3) on the CE client device twin (116); and/or (ii) an empty PH required properties file (e.g., 312, FIG. 3) and PH reported properties file (e.g., 314, FIG. 3) on the PH client device twin (140).

In one or more embodiments of the invention, the IoT hub (150) may be offline for, for example, a system maintenance to configure and upgrade the operating system. While the IoT hub (150) is offline, the connection between the IoT hub (150) and the client device upgrade manager (120) will be disconnected. When the IoT hub (150) comes back online, the client device upgrade manager (120) may reconnect to the IoT hub (150) using the same connection string.

In one or more embodiments of the invention, a device emulation agent (e.g., 222, FIG. 2) may communicate with the client device (112) via the IoT hub (150) to, for example: provide an application upgrade strategy (see, e.g., FIG. 5) to the client device (112); pause or resume an application upgrade executing on the client device (112); receive a report related to actions that have been executed from the client device (112); etc. The device emulation agent (e.g., 222, FIG. 2) may also generate an application upgrade strategy (see, e.g., FIG. 5) and provide the application upgrade strategy (see, e.g., FIG. 5) to the application monitoring agent (132). The application monitoring agent (132) may then provide the application upgrade strategy (see, e.g., FIG. 5) to the PH client device twin (140). Further, the device emulation agent (e.g., 222, FIG. 2) may set a first entry in the PH required properties file (e.g., 312, FIG. 3) of the PH client device twin (140).

In one or more embodiments of the invention, the IoT hub (150) may monitor the CE client device twin (116) and the PH client device twin (140) to identify if any change has occurred in: (i) the CE required properties file (e.g., 302, FIG. 3); (ii) the CE reported properties file (e.g., 304, FIG. 3); (iii) the PH required properties file (e.g., 312, FIG. 3); and/or (iv) the PH reported properties file (e.g., 314, FIG. 3). When the IoT hub (150) determines one or more changes have occurred in the CE client device twin (116), the IoT hub (150) may reflect (e.g., synchronize) those changes to the PH client device twin (140). These changes may be made in real-time. Similarly, when the IoT hub (150) determines one or more changes have occurred in the PH client device twin (140), the IoT hub (150) may reflect those changes to the CE client device twin (116). These changes may also be reflected in real-time. Additional details of the synchronization process are described below in reference to FIGS. 4.1 and 4.2.

In one or more embodiments of the invention, the client device upgrade manager (120) may obtain the application upgrade strategy (see, e.g., FIG. 5) and the CE required properties file (e.g., 302, FIG. 3) by connecting to the CE client device twin (116). The client device upgrade manager (120) may initiate upgrading of the client device (112) using the application upgrade strategy (see, e.g., FIG. 5) and the CE required properties file (e.g., 302, FIG. 3). After initiating the upgrading, the client device upgrade manager (120) may set a second entry in the CE reported properties file (e.g., 304, FIG. 3). In one or more embodiments, the second entry in the CE reported properties file (e.g., 304, FIG. 3) may specify a status of application upgrades that are being executed on the client device (112). Additional details of the upgrade process are described below in reference to FIGS. 4.1 and 4.2.

In one or more embodiments of the invention, to provide computer-implemented services, the IoT hub (150) may perform computations remotely (e.g., away from the PH environment (130)). The computer-implemented services may include, but are not limited to: generating a CE client device twin (116); generating a PH client device twin (140); monitoring a CE client device twin (116); monitoring a PH client device twin (140); providing a connection string to a client device upgrade manager (120); etc.

In one or more embodiments of the invention, the IoT hub (150) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the IoT hub (150) described throughout this application.

Alternatively, in one or more embodiments of the invention, similar to the client device (112), the IoT hub (150) may also be implemented as a logical device.

Figure 2:
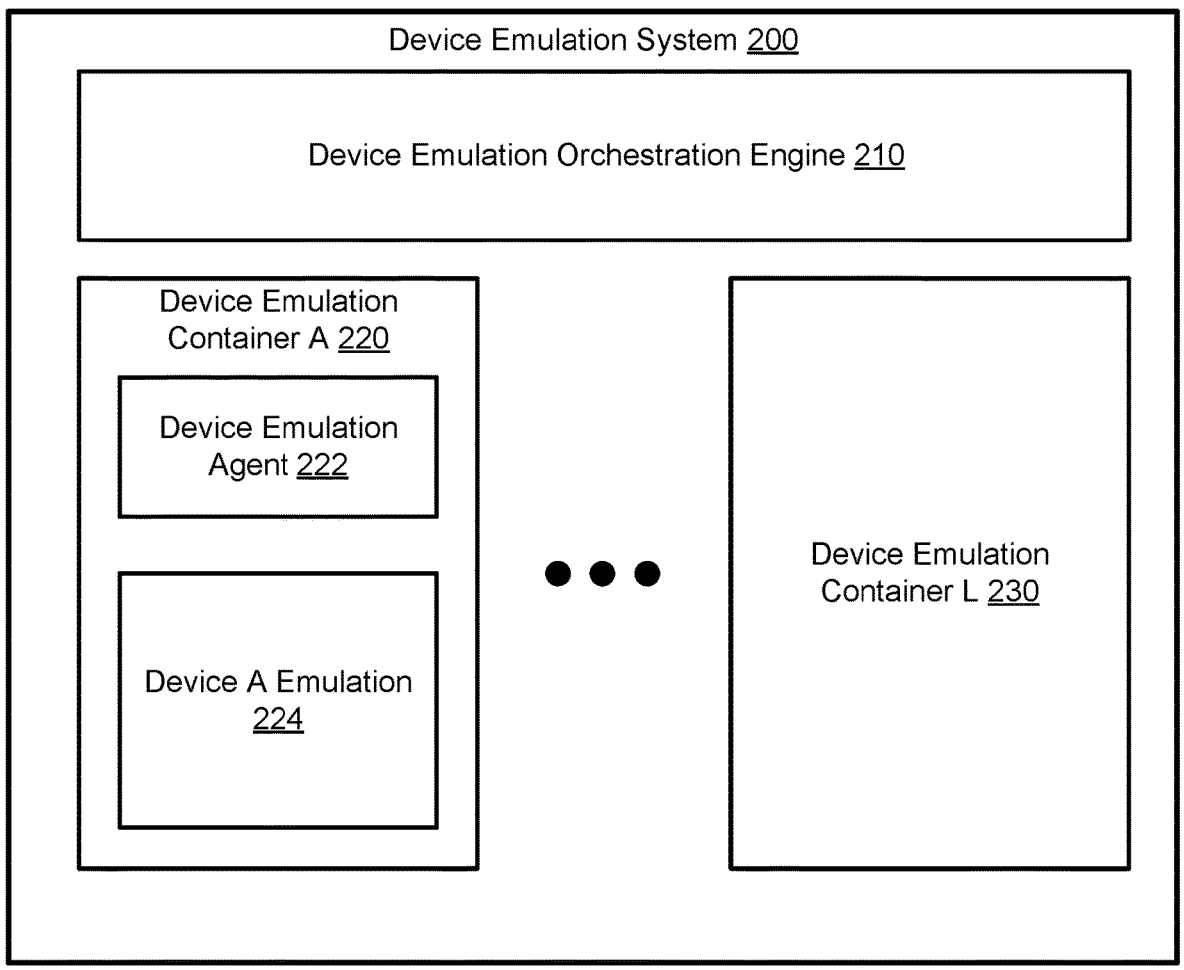
FIG. 2 shows a diagram of a device emulation system in accordance with one or more embodiments of the invention.

Turning now to FIG. 2, FIG. 2 shows a diagram of a device emulation system (200) in accordance with one or more embodiments of the invention. The device emulation system (200) may be an example of the device emulation system (e.g., 136, FIG. 1) discussed above, in which the device emulation system (e.g., 136, FIG. 1) emulates the client device (e.g., 112, FIG. 1). The device emulation system (200) may include the device emulation orchestration engine (210) and one or more device emulation containers (device emulation container A (220), device emulation container L (230)). The device emulation system (200) may include additional, fewer, and/or different components without departing from the scope of the invention. Each component may be operably connected to any of the other component via any combination of wired and/or wireless connections. Each component illustrated in FIG. 2 is discussed below.

In one or more embodiments of the invention, the device emulation orchestration engine (210) orchestrates the generation of the device emulation containers (device emulation container A (220), device emulation container L (230)). For example, the device emulation orchestration engine (210) may receive request(s) from the application monitoring agent (e.g., 132, FIG. 1) to emulate an application upgrade on an emulated client device (e.g., device A emulation (224)). The device emulation orchestration engine (210) may then initiate the emulation of the client device (e.g., 112, FIG. 1) and the application upgrade.

In one or more embodiments of the invention, the device emulation orchestration engine (210) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the device emulation orchestration engine (210) described throughout this application.

Alternatively, in one or more embodiments of the invention, similar to the client device (e.g., 112, FIG. 1), the device emulation orchestration engine (210) may also be implemented as a logical device.

In one or more embodiments of the invention, the device emulation containers (device emulation container A (220), device emulation container L (230)) may include a device emulation agent (222) that monitors the application upgrade(s) executing on the emulated client device (device A emulation (224)). More specifically, the device emulation agent (222) may monitor, for example, the application upgrade(s) performed on the emulated client device (device A emulation (224)) to measure the time taken to perform each application upgrade and to track the number of reboots performed after each application upgrade.

In one or more embodiments of the invention, the monitored parameters may then be used to evaluate the application upgrade(s) and, based on this evaluation, to determine whether the application upgrade(s) should be pushed out to the client device (e.g., 112, FIG. 1).

In one or more embodiments of the invention, the device emulation agent (222) may perform an emulation to generate an application upgrade strategy (see, e.g., FIG. 5) for the emulated client device (device A emulation (224)). In one or more embodiments, the application upgrade strategy (see, e.g., FIG. 5) may be generated based on the available application upgrades for the client device (e.g., 112, FIG. 1) in the application upgrade repository (e.g., 134, FIG. 1).

In one or more embodiments of the invention, the application upgrade strategy (see, e.g., FIG. 5) may be generated in an iterative manner. For example, multiple application upgrade strategies may be evaluated to find the most efficient application upgrade strategy for performing the application upgrades on the emulated client device (device A emulation (224)). For this purpose, hardware capabilities of the emulated client device (device A emulation (224)), including, but not limited to, storage capability of the RAM, processing power of one or more processors may be taken into account while generating the application upgrade strategies. Other hardware capabilities of the emulated client device (device A emulation (224)) not listed above may also be taken into account without departing from the scope of the invention. Additional details of the application upgrade strategy are described below in reference to FIG. 5.

In one or more embodiments of the invention, the device emulation agent (222) may be implemented as a computing device (e.g., 600, FIG. 6). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the device emulation agent (222) described throughout this application.

Alternatively, in one or more embodiments of the invention, similar to the client device (e.g., 112, FIG. 1), the device emulation agent (222) may also be implemented as a logical device.

Figure 3:
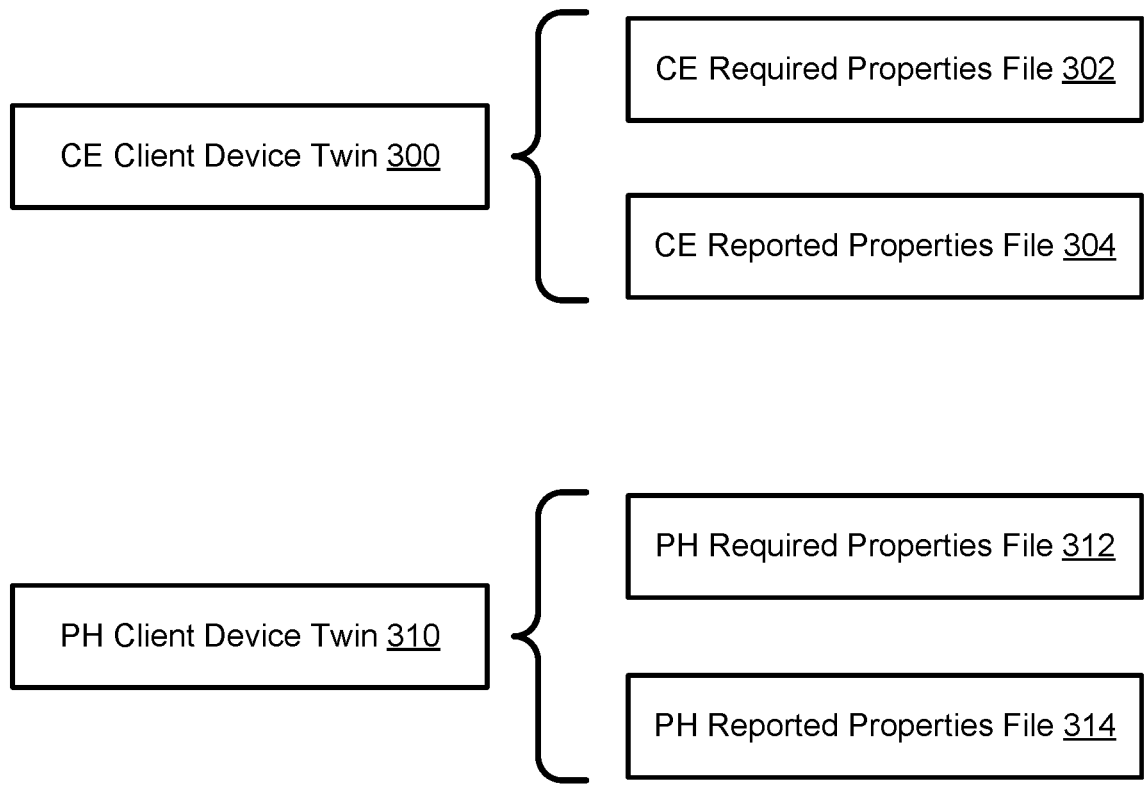
FIG. 3 shows a relationship diagram illustrating a client environment (CE) client device twin and a production host (PH) client device twin in accordance with one or more embodiments of the invention.

Turning now to FIG. 3, FIG. 3 shows a relationship diagram illustrating a CE client device twin (300) and a PH client device twin (310) in accordance with one or more embodiments of the invention. The CE client device twin (300) may be an example of the CE client device twin (e.g., 116, FIG. 1) discussed above. Similarly, the PH client device twin (310) may be an example of the PH client device twin (e.g., 140, FIG. 1). The CE client device twin (300) and the PH client device twin (310) are discussed below in more detail.

In one or more embodiments of the invention, to specify a current device state information of the client device (e.g., 112, FIG. 1), the CE client device twin (300) may include a CE required properties file (302) and a CE reported properties file (304) storing the current device state information. Similarly, to specify the current device state information of the client device (e.g., 112, FIG. 1), the PH client device twin (310) may include a PH required properties file (312) and a PH reported properties file (314) storing the current device state information. The current device state information of the client device (e.g., 112, FIG. 1) may include, but is not limited to: an identifier of an application that is being used by a user of a client device; at least one identifier of an application upgrade of application upgrades that have been successfully completed on a client device; etc.

In one or more embodiments of the invention, the CE required properties file (302) and the CE reported properties file (304) may be generated in a JavaScript object notation (JSON) file format. The CE required properties file (302) and the CE reported properties file (304) may be stored in the IoT hub (e.g., 150, FIG. 1).

In one or more embodiments of the invention, similarly, the PH required properties file (312) and the PH reported properties file (314) may also be generated in the JSON file format. The PH required properties file (312) and the PH reported properties file (314) may also be stored in the IoT hub (e.g., 150, FIG. 1).

In one or more embodiments of the invention, the IoT hub (e.g., 150, FIG. 1) may store one or more entries of the PH required properties file (312) and/or an application upgrade strategy (see, e.g., FIG. 5) in the CE required properties file (302). The entries of the PH required properties file (312) may include actions that need to be executed by the client device (e.g., 112, FIG. 1), as discussed below.

In one or more embodiments of the invention, the entries of the PH required properties file (312) may be set by the device emulation agent (e.g., 222, FIG. 2). In one or more embodiments, the device emulation agent (e.g., 222, FIG. 2) may use metadata of the client device (e.g., 112, FIG. 1) to set the entries of the PH required properties file (312). The device emulation agent (e.g., 222, FIG. 2) may obtain the metadata from the PH client device twin (310). Additional details of the metadata are described below in reference to FIG. 4.1.

In one or more embodiments of the invention, the entries of the PH required properties file (312) may specify that, for example: an application upgrade for an application needs to be paused; an application upgrade for an application needs to be resumed; etc. For example, based on the application upgrade strategy (see, e.g., FIG. 5) and the metadata, the entries of the PH required properties file (312) may specify that: (i) application upgrade C (App. C) should be paused; (ii) application upgrade D (App. D) should be paused; (iii) application upgrade G (App. G) should be resumed; etc.

In one or more embodiments of the invention, the client device (e.g., 112, FIG. 1) may initiate one or more application upgrades based on the entries and/or the application upgrade strategy (see, e.g., FIG. 5) stored in the CE required properties file (302). More specifically, after initiating the application upgrades, the client device upgrade manager (e.g., 120, FIG. 1) may set one or more entries in the CE reported properties file (304) that are to be executed by the client device (e.g., 112, FIG. 1) during the actual application upgrade process. The entries of the CE reported properties file (304) may include, but are not limited to: at least one identifier of an application upgrade, among other application upgrades, that has been successfully completed on a client device; at least one identifier of an application upgrade that has been successfully paused on a client device; etc.

In one or more embodiments of the invention, for example, the entries of the CE reported properties (304) may specify information such as: (i) App. C has been paused on a client device; App. D has been paused on a client device; (iii) App. G has been completed on a client device; etc. In one or more embodiments, the client device upgrade manager (e.g., 120, FIG. 1) may use the current device state information of the client device (e.g., 112, FIG. 1) to set the entries of the CE reported properties file (304). This will be discussed below in more detail in the examples of FIGS. 4.1 and 4.2. The IoT hub (e.g., 150, FIG. 1) may then store the entries of the CE reported properties file (304) in the PH reported properties file (314).

FIGS. 4.1 and 4.2 show a method for executing an application upgrade based on real-time monitoring of a plurality of client device twins in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be executed by, for example, the above-discussed application monitoring agent (e.g., 132, FIG. 1) in combination with the client device upgrade manager (e.g., 120, FIG. 1), the IoT hub (e.g., 150, FIG. 1), and the device emulation agent (e.g., 222, FIG. 2). Other components of the system (100) illustrated in FIG. 1 may also execute all or part of the method shown in FIG. 4.1 without departing from the scope of the invention.

In Step 400, metadata of the client device (e.g., 112, FIG. 1) is obtained from the PH client device twin (e.g., 140, FIG. 1) by the application monitoring agent. In one or more embodiments, the metadata of the client device may include, but is not limited to: an application usage history; a device idle time history; a real-time application usage; etc.

In one or more embodiments of the invention, the application usage history may specify how frequently an application is used on the client device by the user of the client device. The application usage history may also specify an application usage behavior of the user. For example, the application usage history may specify that the user uses a media player application every Saturday from 11:00 a.m. to 4:00 p.m.

In one or more embodiments of the invention, the device idle time history may specify a period of time where the client device is powered on but is not in use. For example, the device idle time history may specify that the client device is idle every day from 2:00 a.m. to 6:00 a.m.

In one or more embodiments of the invention, the real-time application usage may specify an active application that is currently being used by the user. For example, the real-time application usage may specify that the user is currently using the media player application.

In Step 402, the metadata is provided to the device emulation agent by the application monitoring agent.

Figure 5:
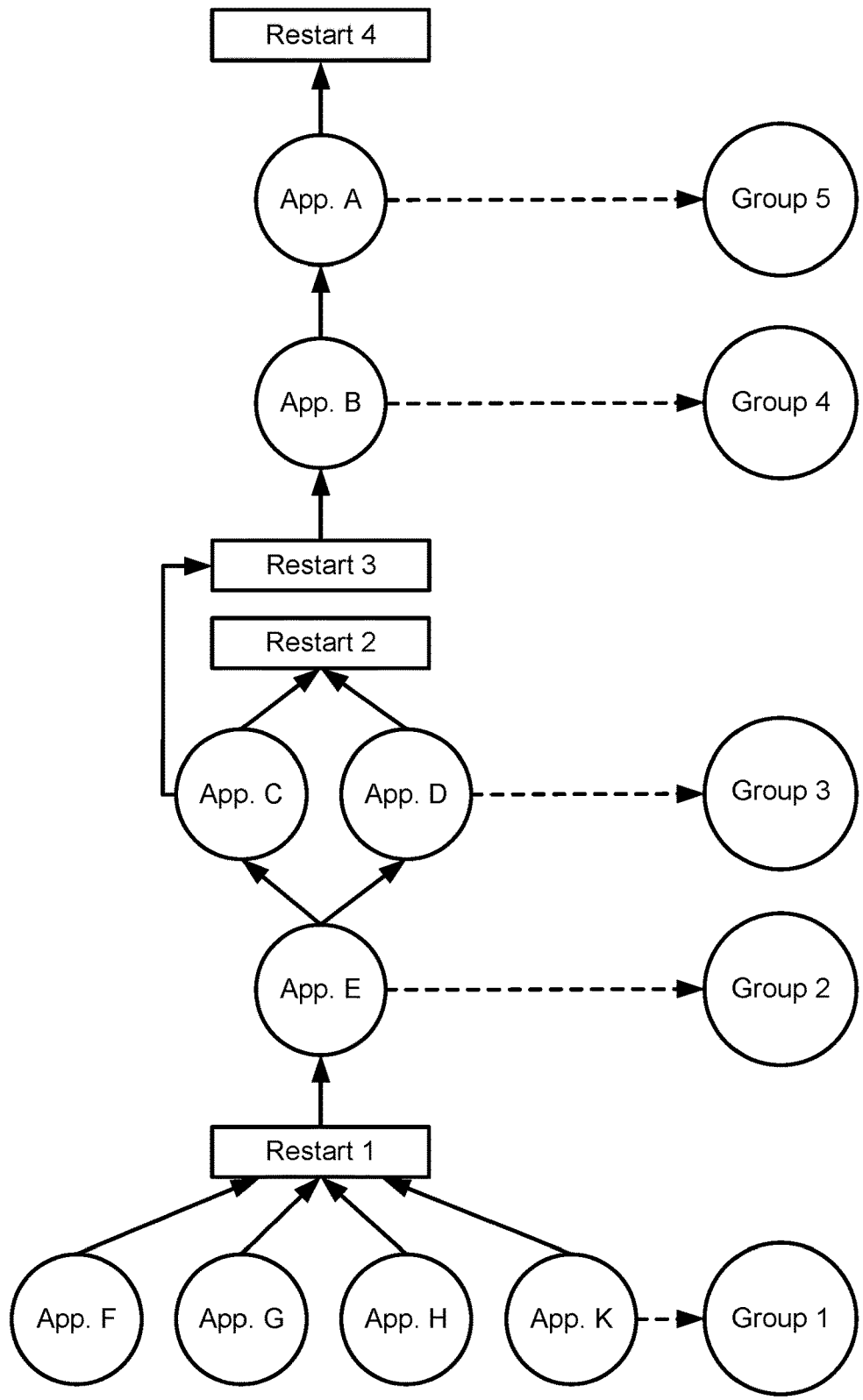
FIG. 5 shows an application upgrade strategy in accordance with one or more embodiments of the invention.

In Step 404, an emulation is executed to generate an application upgrade strategy (see, e.g., FIG. 5). In one or more embodiments, the device emulation agent may use the metadata to generate the application upgrade strategy.

In Step 406, a first entry is set in the PH required properties file (e.g., 312, FIG. 3) of the PH client device twin (e.g., 310, FIG. 3) using the metadata. Details of the PH required properties file (e.g., 312, FIG. 3) are described above in reference to FIG. 3.

Using the examples discussed above in Step 400 as reference, based on the application usage history and the device idle time history, the application upgrade strategy may specify that the media player application will be upgraded on Monday at 4:00 a.m.

However, based on the real-time application usage, the device emulation agent may determine that the user is currently using the media player application at 4:00 a.m. on Monday (e.g., the time when the media player is scheduled to be upgraded). The device emulation agent may then set the first entry to pause the upgrade of the media player application.

In one or more embodiments of the invention, the device emulation agent may also set the first entry to resume the upgrade of an application. For example, the user may be using a web browser at some point in time. This causes the upgrade of web browser to be paused. At a later point in time, when the user has stopped using the web browser, the device emulation agent may set the first entry to resume the upgrade of the web browser.

In one or more embodiments of the invention, the device emulation agent may determine when an application is no longer being used based on a schedule forecast. In one or more embodiments, the schedule forecast may be generated based on the application usage history and the device idle time history. For example, the application usage history and the device idle time history may specify that every Monday, Wednesday, and Friday, the client device is idle between 2:00 a.m. to 4:00 a.m. The schedule forecast may then recommend to resume upgrading the web browser on Friday between 2:00 a.m. to 4:00 a.m. The device emulation agent may resume upgrading the web browser based on the schedule forecast's recommendation.

In one more embodiments of the invention, the device emulation agent may not set the first entry if the client device is already idle. In this case, the method may proceed to Step 408 from Step 404.

In Step 408, the application upgrade strategy is provided to the application monitoring agent by the device emulation agent.

In Step 410, the application upgrade strategy is provided to the PH client device twin by the application monitoring agent.

In Step 412, the application upgrade strategy and the first entry are transferred, in real-time via the IoT hub, from the PH client device twin to the CE client device twin.

In one or more embodiments of the invention, if the client device is already idle, the IoT hub may only transfer the application upgrade strategy without also transferring the first entry.

In Step 414, the application upgrade strategy and the first entry are stored, by the IoT hub, in the CE required properties file of the CE client device twin.

In one or more embodiments of the invention, if the client device is already idle, the IoT hub may only store the application upgrade strategy in the CE required properties file.

In Step 416, the application upgrade strategy and the first entry are obtained from the CE required properties file by the client device upgrade manager.

In one or more embodiments of the invention, if the client device is already idle, the client device upgrade manager may only obtain the application upgrade strategy.

In Step 418, upgrading of the client device is initiated (e.g., instantiated, executed, etc.) by the client device upgrade manager using the application upgrade strategy and the first entry. In one or more embodiments, for example, even though an application G (App. G) needs to be executed based on the application upgrade strategy, the client device upgrade manager may pause App. G based on the first entry.

In one or more embodiments of the invention, if the client device is already idle, the client device upgrade manager may initiate upgrading of the client device (e.g., 112, FIG. 1) only using the application upgrade strategy (see, e.g., FIG. 5).

In one or more embodiments of the invention, the method may end following Step 418.

Turning now to FIG. 4.2, the method shown in FIG. 4.2 may be executed by, for example, the above-discussed application monitoring agent in combination with the IoT hub, the client device upgrade manager, and the device emulation agent. Other components of the system (100) illustrated in FIG. 1 may also execute all or part of the method shown in FIG. 4.2 without departing from the scope of the invention.

In Step 420, a second entry is set in the CE reported properties file of the CE client device twin by the client device upgrade manager. Details of the CE reported properties file (e.g., 304, FIG. 3) are described above in reference to FIG. 3.

In Step 422, the second entry is transferred, in real-time via the IoT hub, from the CE client device twin to the PH client device twin.

In Step 424, the second entry is stored, by the IoT hub, in the PH reported properties file of the PH client device twin.

In Step 426, the second entry is obtained from the PH reported properties file by the application monitoring agent.

In Step 428, the second entry is provided to the device emulation agent by the application monitoring agent.

In Step 430, a status of one or more application upgrades that are being executed on the client device is verified by the emulation agent using the second entry.

In one or more embodiments of the invention, the device emulation agent may execute the verification by comparing the second entry with the first entry. Continuing with the examples discussed above in FIG. 3, if the second entry complies with the first entry (i.e., the two entries are identical), the device emulation agent may determine that the status of the application upgrades are successful. However, if the second entry does not comply with the first entry (i.e., the two entries are different), the device emulation agent may that the application upgrades are unsuccessful.

In one or more embodiments of the invention, the method may end following Step 430.

Turning now to FIG. 5, FIG. 5 shows an application upgrade strategy in accordance with one or more embodiments of the invention. In one or more embodiments, the application upgrade strategy may include one or more application upgrades to be performed (e.g., App. A, App. C, App. F, etc.). The application upgrade strategy may also include one or more restarts (e.g., Restart 1, Restart 2, Restart 3, etc.) to be performed on the client device (e.g., 112, FIG. 1) such that the effect(s) of completed application upgrades can be applied to the client device (e.g., 112, FIG. 1).

In one or more embodiments of the invention, related ones of the application upgrades (e.g., App. F, App. G, App. H, App. K) (also referred to herein as "related application upgrades") for the client device (e.g., 112, FIG. 1) may be classified and named as a group of application upgrades (e.g., Group 1). In this manner, a restart (e.g., Restart 1) may be performed to apply the effect(s) of the group of application upgrades (e.g., Group 1) to the client device (e.g., 112, FIG. 1). Additionally, a restart (e.g., Restart 3) may also be performed to apply the effect(s) of an individual application upgrade (e.g., App. C) to the client device (e.g., 112, FIG. 1).

In one or more embodiments of the invention, the related application upgrades may be classified based on, for example, their names and/or their types (e.g., corrective application upgrade, functional application upgrade, etc.). The related application upgrades may also be classified based on other parameters not listed above without departing from the scope of the invention.

Turning now to FIG. 6, FIG. 6 shows a diagram of a computing device in accordance with one or more embodiments of the invention.

In one or more embodiments of the invention, the computing device (600) may include one or more computer processors (602), non-persistent storage (604) (e.g., volatile memory, such as RAM, cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), an input device(s) (610), an output device(s) (608), and numerous other elements (not shown) and functionalities. Each of these components is described below.

In one or more embodiments, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN), such as the Internet, mobile network, or any other type of network) and/or to another device, such as another computing device.

In one or more embodiments, the computing device (600) may include one or more output devices (608), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing an application upgrade, the method comprising:
   obtaining metadata associated with a client device from a production host (PH) client device twin executing in a PH environment;
   executing, using the metadata, an emulation to generate an application upgrade strategy for applying a plurality of application upgrades on the client device;
   setting, using the metadata, a first entry in a PH required properties file of the PH client device twin;
   transferring the application upgrade strategy and the first entry from the PH client device twin to a client environment (CE) client device twin in real-time via an Internet of Things (IoT) hub;
   storing, on the CE client device twin, the application upgrade strategy and the first entry in a CE required properties file;
   initiating, after the storing and on the client device, the plurality of application upgrades based on the application upgrade strategy and the first entry;
   after the initiating, setting a second entry in a CE reported properties file on the CE client device twin, wherein the second entry is associated with a current device state of the client device;
   transferring the second entry from the CE client device twin to the PH client device twin in real-time via the IoT hub; and
   verifying, in the PH environment, a status of the plurality of application upgrades on the client device using the second entry.

2. The method of claim 1, further comprising:
   after the transferring the second entry, storing, on the PH client device twin, the second entry in a PH reported properties file.

3. The method of claim 1, wherein the first entry comprises an identifier of an application and specifies that an application upgrade for the application needs to be paused.

4. The method of claim 3, wherein the first entry further comprises a second identifier of a second application and specifies that an application upgrade for the second application needs to be resumed.

5. The method of claim 1, wherein the second entry comprises at least one identifier of an application upgrade of a plurality of application upgrades that has been successfully completed on the client device.

6. The method of claim 1, wherein the metadata associated with the client device comprises an application usage history for a prior time period and a real-time application usage for a current time period.

7. The method of claim 1, the PH client device twin is a real-time digital instance of the client device that indicates current device state information of the client device.

8. The method of claim 1, the CE client device twin is a real-time digital instance of the client device that indicates current device state information of the client device.

9. A method for managing an application upgrade, the method comprising:
obtaining metadata associated with a client device from a production host (PH) client device twin executing in a PH environment;
executing, using the metadata, an emulation to generate an application upgrade strategy for applying a plurality of application upgrades on the client device;
setting, using the metadata, an entry in a PH required properties file of the PH client device twin;
transferring the application upgrade strategy and the entry from the PH client device twin to a client environment (CE) client device twin in real-time via an Internet of Things (IoT) hub;
storing, on the CE client device twin, the application upgrade strategy and the entry in a CE required properties file; and
initiating, after the storing and on the client device, the plurality of application upgrades based on the application upgrade strategy and the entry.

10. The method of claim 9, wherein the entry comprises an identifier of an application and specifies that an application upgrade for the application that needs to be paused.

11. The method of claim 10, wherein the entry further comprises a second identifier of a second application and specifies that an application upgrade for the second application needs to be resumed.

12. The method of claim 9, wherein the metadata associated with the client device comprises an application usage history for a prior time period and a real-time application usage for a current time period.

13. The method of claim 9, the PH client device twin is a real-time digital instance of the client device that indicates current device state information of the client device.

14. The method of claim 9, the CE client device twin is a real-time digital instance of the client device that indicates current device state information of the client device.

15. A method for managing an application upgrade, the method comprising:
setting an entry in a client environment (CE) reported properties file of the CE client device twin, wherein the entry is associated with a current device state of a client device;
transferring the entry from the CE client device twin to a production host (PH) client device twin in real-time via an Internet of Things (IoT) hub;
storing, on the PH client device twin, the entry in a PH reported properties file; and
verifying, in a PH environment, a status of a plurality of application upgrades on the client device using the entry.

16. The method of claim 15, wherein the PH client device twin executes in the PH environment.

17. The method of claim 15, wherein the entry comprises at least one identifier of an application upgrade of a plurality of application upgrades that has been successfully completed on the client device.

18. The method of claim 15, wherein the entry further comprises at least one identifier of an application upgrade of a plurality of application upgrades that has been successfully paused on the client device.

19. The method of claim 15, the PH client device twin is a real-time digital instance of the client device that indicates current device state information of the client device.

20. The method of claim 15, the CE client device twin is a real-time digital instance of the client device that indicates current device state information of the client device.

\* \* \* \* \*